(12) United States Patent
Mitchell et al.

(10) Patent No.: US 9,833,931 B2
(45) Date of Patent: Dec. 5, 2017

(54) METHOD AND APPARATUS FOR REMOVING FLASH FROM A TIRE

(71) Applicant: Akron Special Machinery, Inc., Akron, OH (US)

(72) Inventors: Brian Mitchell, Akron, OH (US); Matthew Blubaugh, Massillon, OH (US); Jason Vahila, Canton, OH (US); John Fuhrman, Ravenna, OH (US)

(73) Assignee: Akron Special Machinery, Inc., Akron, OH (US)

( * ) Notice: Subject to any disclaimer, the term of this patent is extended or adjusted under 35 U.S.C. 154(b) by 74 days.

(21) Appl. No.: 15/040,286

(22) Filed: Feb. 10, 2016

(65) Prior Publication Data

US 2017/0225367 A1 Aug. 10, 2017

(51) Int. Cl.
| | | |
|---|---|---|
| *B24B 49/12* | (2006.01) | |
| *B29C 37/02* | (2006.01) | |
| *B24B 5/36* | (2006.01) | |
| *B29D 30/06* | (2006.01) | |
| *B29K 21/00* | (2006.01) | |
| *B29K 105/00* | (2006.01) | |
| *B29L 30/00* | (2006.01) | |

(52) U.S. Cl.
CPC ............ *B29C 37/02* (2013.01); *B24B 5/366* (2013.01); *B24B 49/12* (2013.01); *B29D 30/0681* (2013.01); *B29K 2021/00* (2013.01); *B29K 2105/258* (2013.01); *B29L 2030/002* (2013.01)

(58) Field of Classification Search
CPC ......... B24B 49/12; B24B 5/366; B29C 37/02; B29D 30/0681
USPC .................. 451/6, 5, 8–10, 49, 57–58
See application file for complete search history.

(56) References Cited

U.S. PATENT DOCUMENTS

| | | | | |
|---|---|---|---|---|
| 2,815,073 A * | 12/1957 | Wikle | ............. | B29C 37/02 157/13 |
| 3,075,574 A * | 1/1963 | Groves | ............ | B29C 37/02 157/13 |
| 3,832,972 A * | 9/1974 | Pace | .............. | B26D 3/003 118/316 |
| 4,059,139 A * | 11/1977 | Nishimoto | ......... | B29C 37/02 157/13 |
| 4,663,889 A * | 5/1987 | Strand | ............ | B24B 5/366 451/28 |
| 5,179,806 A * | 1/1993 | Brown | ............ | B24B 5/366 451/134 |
| 8,231,428 B2 | 7/2012 | Poling, Sr. et al. | | |

* cited by examiner

*Primary Examiner* — Robert Rose
(74) *Attorney, Agent, or Firm* — Renner, Kenner, Greive, Bobak, Taylor & Weber

(57) ABSTRACT

An apparatus for removing flash from a tire includes a laser sensor which, while the tire is rotating, can be moved along the outer contour of the shoulders and tread area of a tire to detect the contour of the tire. A first sanding assembly removes the flash from the tread area, while the tire is not rotating, by moving horizontally and vertically in accordance with the detected contour of the tread area. A second sanding assembly removes the flash from the shoulder area, while the tire is rotating, by moving horizontally, vertically, and pivotally in accordance with the detected contour of the shoulder area.

22 Claims, 7 Drawing Sheets

METHOD AND APPARATUS FOR REMOVING FLASH FROM A TIRE

TECHNICAL FIELD

This invention relates to a machine for removing flash from a tire and its method of operation. More specifically, this invention relates to such a machine which can remove flash both from the tread area and from the shoulder area of a tire.

BACKGROUND ART

Automotive tires are typically made in molds in tire presses. These molds are usually segmented, that is, circumferentially split into several segments. Oftentimes flashs of rubber material are formed on the tread and shoulder areas of the tire at the junction of the mold segments. Such becomes more prevalent as molds wear from repeated use.

Such flash is undesirable for several reasons. First, when the automobile manufacturer aligns the front and rear tires, any flash can cause false alignment readings. In addition, the presence of flash is aesthetically undesirable in that the user, when purchasing a tire, may not want a tire which appears defective because of the presence of flash. Thus, tire manufactures will take all steps necessary to remove any flash before shipping new tires to an automotive manufacturer or to an auto equipment retail outlet.

Currently, the removal of most flash-laden tires is done by hand. Such is obviously labor intensive and thus is time consuming and costly. The tire manufacturer often uses tire uniformity machines, such as disclosed in U.S. Pat. No. 8,231,428, to grind unwanted material off the treads of a tire to get rid of runout, but such machines are unable to be used to identify the location of flash on the shoulders and treads of a tire and remove such flash.

Thus, the need exists for a machine which can locate and readily remove undesirable flash from the tread area and shoulders of a tire.

DISCLOSURE OF THE INVENTION

It is thus an object of one aspect of the present invention to provide a device which locates and thereafter removes flash from a tire.

It is an object of another aspect of the present invention to provide a device, as above, which can remove flash from the tread area and the shoulder area of a tire.

It is an object of an additional aspect of the present invention to provide a device, as above, with a sanding wheel which is linearly moveable to remove flash from the tread of a tire, and another sanding wheel which is linearly and pivotally moveable to remove flash from the shoulder of a tire.

These and other objects of the present invention, as well as the advantages thereof over existing prior art forms, which will become apparent from the description to follow, are accomplished by the improvements hereinafter described and claimed.

In general, an apparatus for removing flash from a tire made in accordance with the present invention includes a sensor to detect the contour of the tire. A first sanding assembly is moveable in accordance with the detected contour to remove flash from the tread of the tire, and a second sanding assembly is moveable in accordance with the detected contour to remove flash from the shoulder of the tire.

The method of removing flash from a tire in accordance with the present invention includes the steps of rotating the tire, sensing the contour of the rotating tire, removing tread flash from the detected contour of the tread area of the tire while the tire is not rotating, and removing shoulder flash from the detected contour of the shoulder area of the tire while the tire is rotating.

A preferred exemplary machine and method for removing flash from a tire according to the concepts of the present invention is shown by way of example in the accompanying drawings without attempting to show all the various forms and modifications in which the invention might be embodied, the invention being measured by the appended claims and not by the details of the specification.

PREFERRED EMBODIMENT FOR CARRYING OUT THE INVENTION

Figure 1:
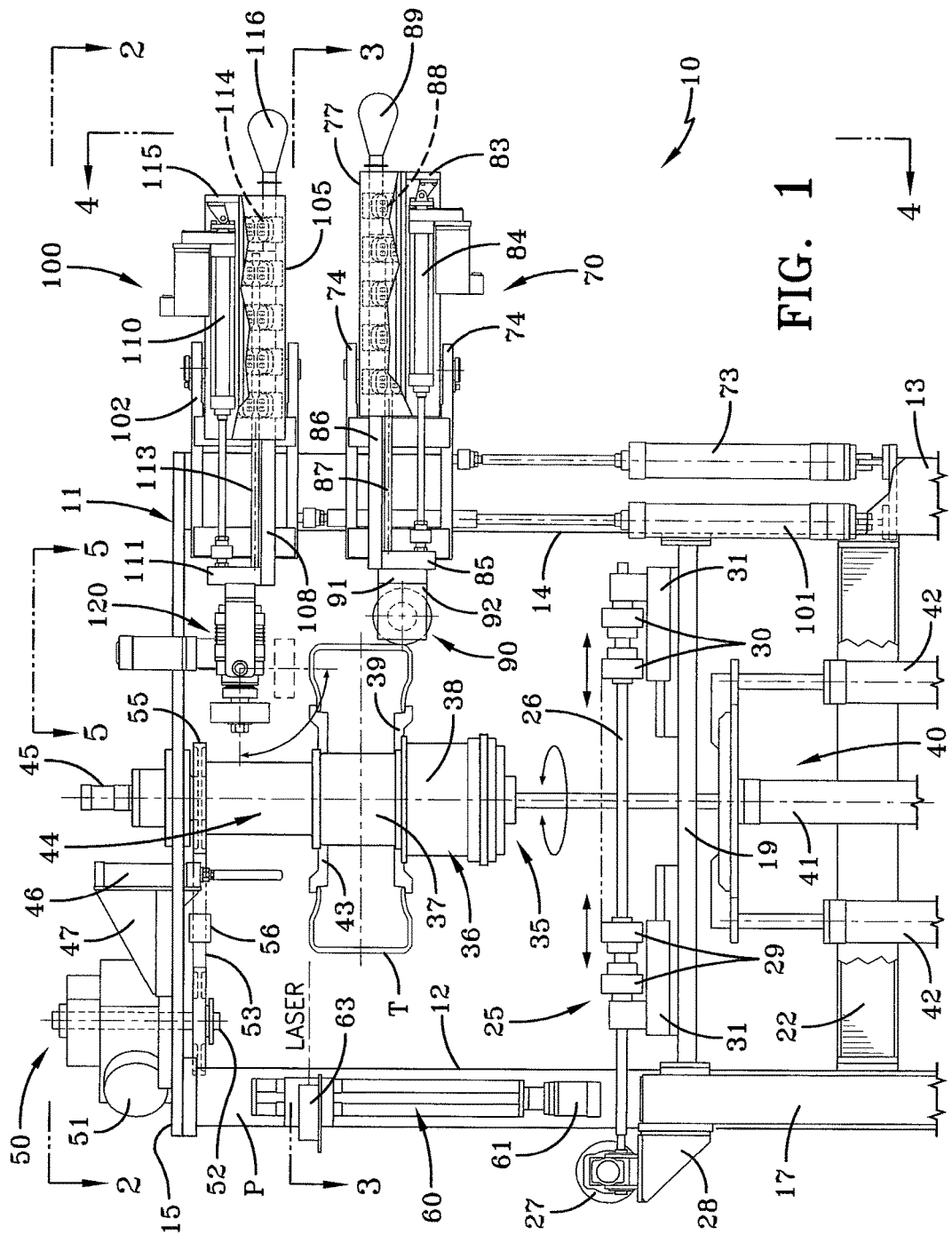
FIG. 1 is a somewhat schematic front elevational view of the machine for removing flash from a tire made in accordance with the present invention.

A machine for removing flash from a tire in accordance with the present invention is indicated generally by the numeral 10, and it includes a frame indicated generally by the numeral 11. Frame 11 includes three generally vertical beams 12, 13, and 14 which carry a top plate 15. Beams 13 and 14 are connected by a cross member 16. Two shorter vertical beams 17 and 18 are provided opposite to beams 13 and 14 respectively. Beam 17 is connected to beam 13 by a cross member 19, and beam 18 is connected to beam 14 by a cross member 20. For stability, cross members 19 and 20 are connected by a beam 21. A second cross member 22 extends between beam 17 and beam 13 at a position below cross member 19.

Cross member 19 supports a conveyor assembly generally indicated by the numeral 25 and somewhat schematically shown in FIG. 1. Conveyor 25 includes a shaft 26 driven by a motor 27 supported on a gusset plate 28 carried by beam 17. Shaft 26 carries sets of spaced conveyor rollers 29 and 30 to support a tire T as it is being transported on conveyor assembly 25 into machine 10. The spacing between rollers 29 and 30 may be adjusted by slide bearings 31 in a conventional manner to adjust conveyor assembly 25 dependent on the size of the tire T.

A lower chuck or spindle assembly is generally indicated by the numeral 35, and it is supported by cross member 22. Assembly 35 includes a lower spindle 36 having an upper portion 37 of a smaller diameter than a lower portion 38. Lower portion 38 carries a rim 39 for the seating of a tire T. If machine 10 is working on a smaller tire, the lower portion 38 of lower spindle 36 can telescope over upper portion 37.

Assembly 35 is movable upwardly from the chain line position in FIG. 1 to the full line position by a cylinder assembly generally indicated by the numeral 40. Cylinder assembly 40 is supported by cross member 22 and includes a prime cylinder 41 which raises and lowers the lower spindle assembly 35. If desired, in order to shorten the stroke of prime cylinder 41, secondary cylinders 42 may be provided. These cylinders can first raise cylinder 41 which may then, with a shorter stroke, raise spindle assembly 35. When spindle assembly 35 is raised, it picks up tire T off the conveyor assembly 25 and moves it upwardly until it engages a rim 43 carried by a upper spindle assembly 44 carried by top plate 15. Tire T may then be inflated by air transmitted through a channel at the top 45 of the upper spindle assembly 44. When the de-flash process on tire T is complete, it may be necessary to use a cylinder activated stripper wheel 46 to break the seal of the bead of tire T on rim 43. Cylinder stripper wheel 46 is supported by gussets 47 mounted to top plate 15.

The upper and lower spindle assemblies 35, 44 and tire T are rotated by a drive motor assembly generally indicated by the numeral 50 and carried by top plate 15. Assembly 50 includes a servo motor 51 which rotates a shaft 52 having a pulley 53 which carries a belt 54. Belt 54 extends around a pulley 55 carried by upper spindle assembly 44. A conventional belt adjuster system 56 may be provided to adjust the tension on belt 54. Thus, upon activation of motor 51, tire T will rotate.

A laser sensor assembly is generally indicated by the numeral 60 and is carried by vertical beam 12. Laser assembly 60 includes a servo motor 61 which rotates the screw 62 of a linear actuator which moves a laser 63 upwardly and downwardly. Laser 63 is shown in its home position in FIG. 1 at the top shoulder area of tire T. With motor 51 activated and tire T spinning, motor 61 is turned on to move laser 63 down across the tread area. As such, the laser 63 scans the shoulder and tread areas of tire T to determine the location and profile of the shoulder area and the tread area. Such can change dependent on the size of the tire T, and thus the result is that information regarding the profile of the tire is obtained. This information is fed to and stored by a controller (not shown) which will use that information to control the flash sanding assemblies, now to be described.

Figure 3:
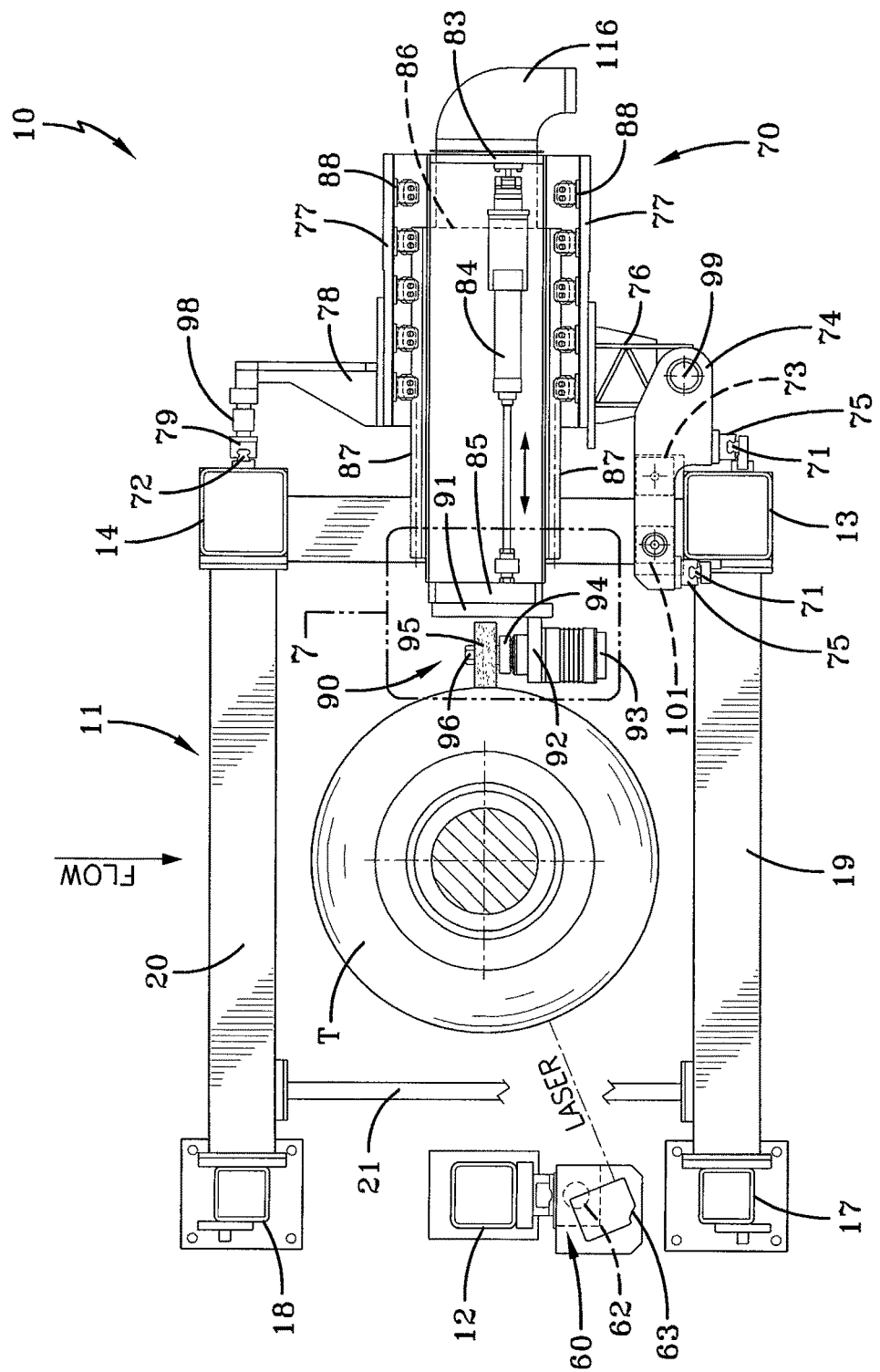
FIG. 3 is a view taken substantially along line 3-3 of FIG. 1.
Figure 4:
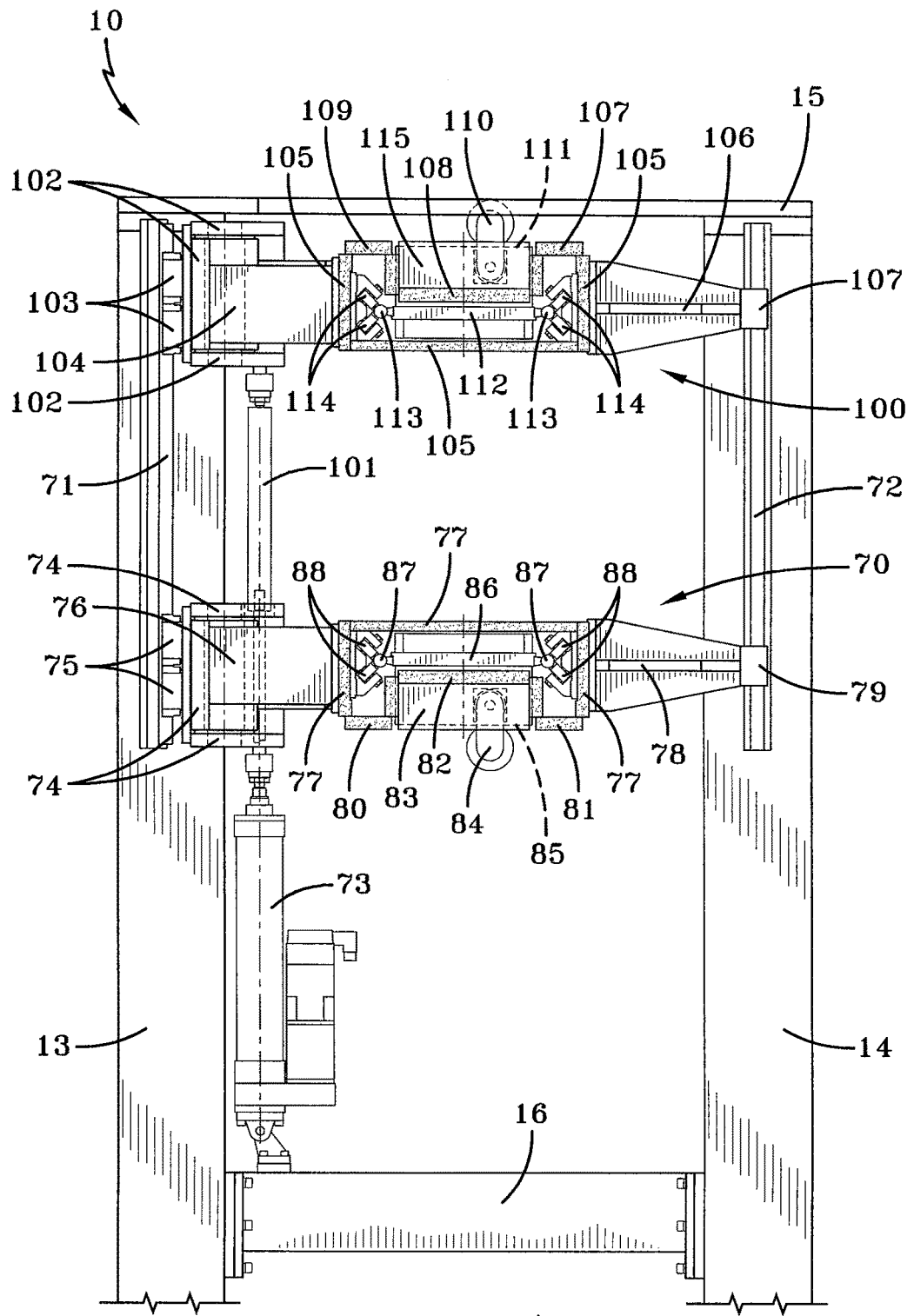
FIG. 4 is a somewhat schematic side elevational view taken along line 4-4 of FIG. 1.

A tire tread sanding assembly is generally indicated by the numeral 70 and is best shown in FIGS. 1, 3, and 4. Tread sanding assembly 70 is vertically moveable on tracks 71 and 72, carried by beams 13 and 14, respectively, by a cylinder 73 carried by cross member 16. Assembly 70 includes a C-shaped frame 74, with cylinder 73 being attached to one branch of frame 74 to move frame 74 and all associated members vertically. Frame 74 carries slides 75 that ride on track 71. A plate 76 is attached at one end to frame 74 and at its other end plate 76 is attached to one branch of a U-shaped slide bracket 77. The opposed branch of bracket 77 is attached to a bracket 78 that carries slides 79 received in track 71 on beam 14. The branches of bracket 77 also carry plates 80 and 81 which in turn carry a U-shaped channel 82 having an end plate 83. As shown in FIG. 1, each plate 83 supports a cylinder 84 which is attached at its other end to a branch 85 of a slide plate which is L-shaped having another branch 86. As shown in FIG. 4, the lateral edges of branch 86 are formed with cylindrical pins 87 that ride on rollers 88 that are positioned on the branches of bracket 77. Upon activation of cylinder 84, pins 87 on branch 86 of the slide plate ride on rollers 88 to move the slide plate to the left or right as seen in FIG. 1. Sanding assembly 70 may also include a vacuum system 89, schematically shown in FIGS. 1 and 3, to remove debris which is sanded off the tread of the tire T.

Figure 7:
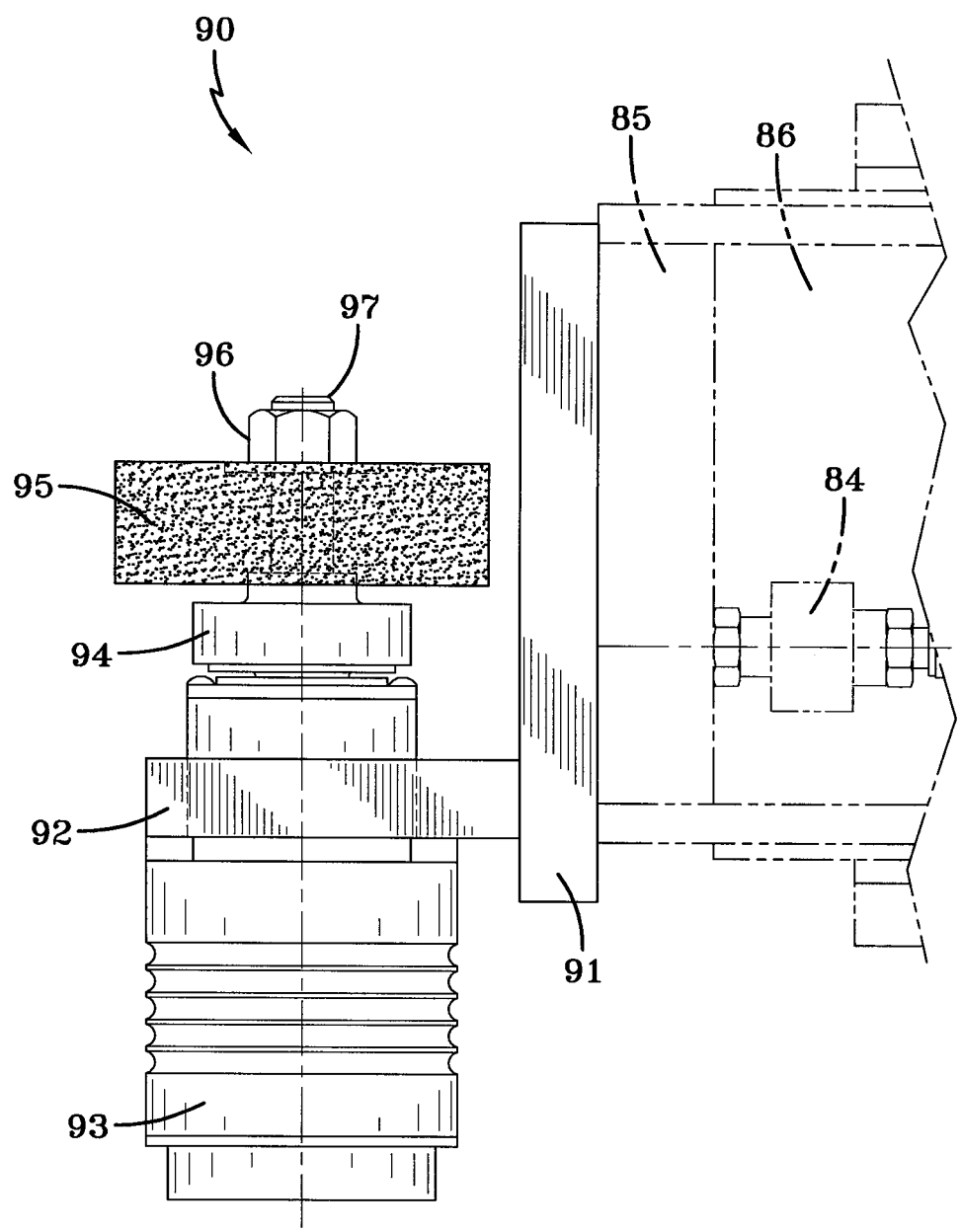
FIG. 7 is an elevational view of the tread flash removing assembly shown in the rectangle in FIG. 3.

Branch 85 of the slide plate carries a tread sanding head generally indicated by the numeral 90 and best shown in FIG. 7. Tread sanding head 90 includes a mounting plate 91 which carries a motor mounting plate 92 that carries a motor 93. An adapter 94 is carried by the shaft 97 of motor 93, and a sanding disc 95 is attached to adapter 94 by a nut 96 received on shaft 97. As such, the disc 95 can be readily replaced when worn. To do so, as shown in FIG. 3, bracket 78 is provided with a disconnect assembly 98 so that sanding assembly 70 may be pivoted on frame 74, as at 99, to gain access to sanding disc 95.

Figure 2:
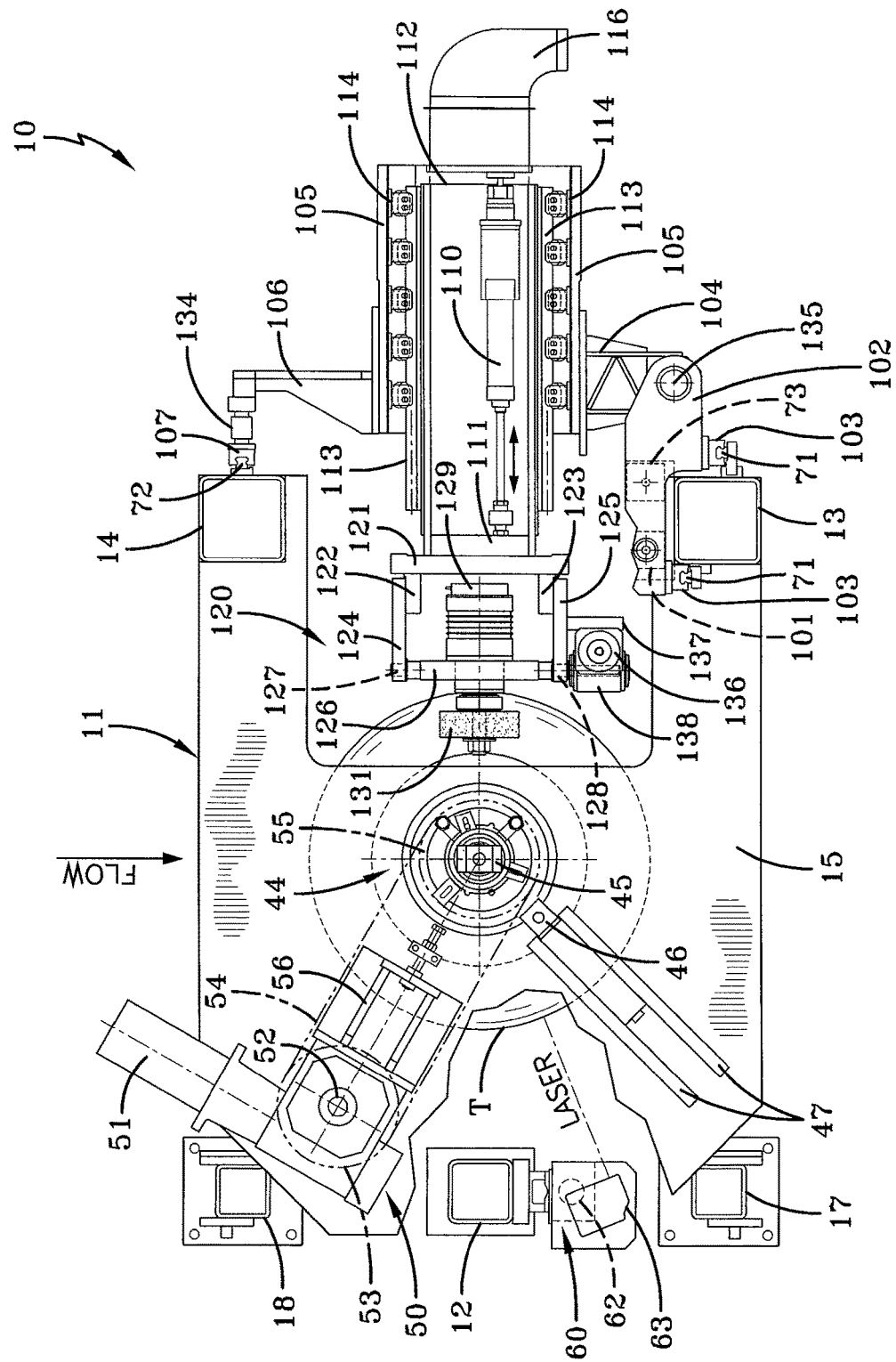
FIG. 2 is a top plan view taken substantially along line 2-2 of FIG. 1.

A tire shoulder sanding assembly is generally indicated by the numeral 100 and is best shown in FIGS. 1, 2, and 4. Shoulder assembly 100 is generally a duplicate of tread sanding assembly 70, and thus, it too is vertically moved on tracks 71 and 72, carried by beams 13 and 14, respectively, by a cylinder 101 which is carried by cross member 16. Assembly 100 includes a C-shaped frame 102, with cylinder 101 being attached to one branch of frame 102 to move frame 102 and all associated members vertically. Frame 102 carries slides 103 that ride on tracks 71. A plate 104 is attached at one end to frame 102 and at its other end plate 104 is attached one branch of a U-shaped slide bracket 105. The opposed branch of bracket 105 is attached to a bracket 106 that carries slides 107 received on track 72 on beam 14. The branches of bracket 105 also carry plates 109 and 107 which in turn carry a U-shaped channel 108 having an end plate 115. As shown in FIG. 1, each plate 115 supports a cylinder 110 which is attached at its other end to a branch 111 of a slide plate which is L-shaped having another bracket 112. As shown in FIG. 4, the lateral edges of branch 112 are formed with cylindrical pins 113 that ride on rollers 114 that are positioned on the branches of bracket 105. Upon activation of cylinder 110, pins 113 on branch 112 of the slide plate ride on rollers 114 to move the slide plate to the left or right as seen in FIG. 1. Shoulder sanding assembly 100 may also include a vacuum system 116, schematically shown in FIGS. 1 and 3, to remove debris which is sanded off the shoulder of the tire T.

Figure 5:
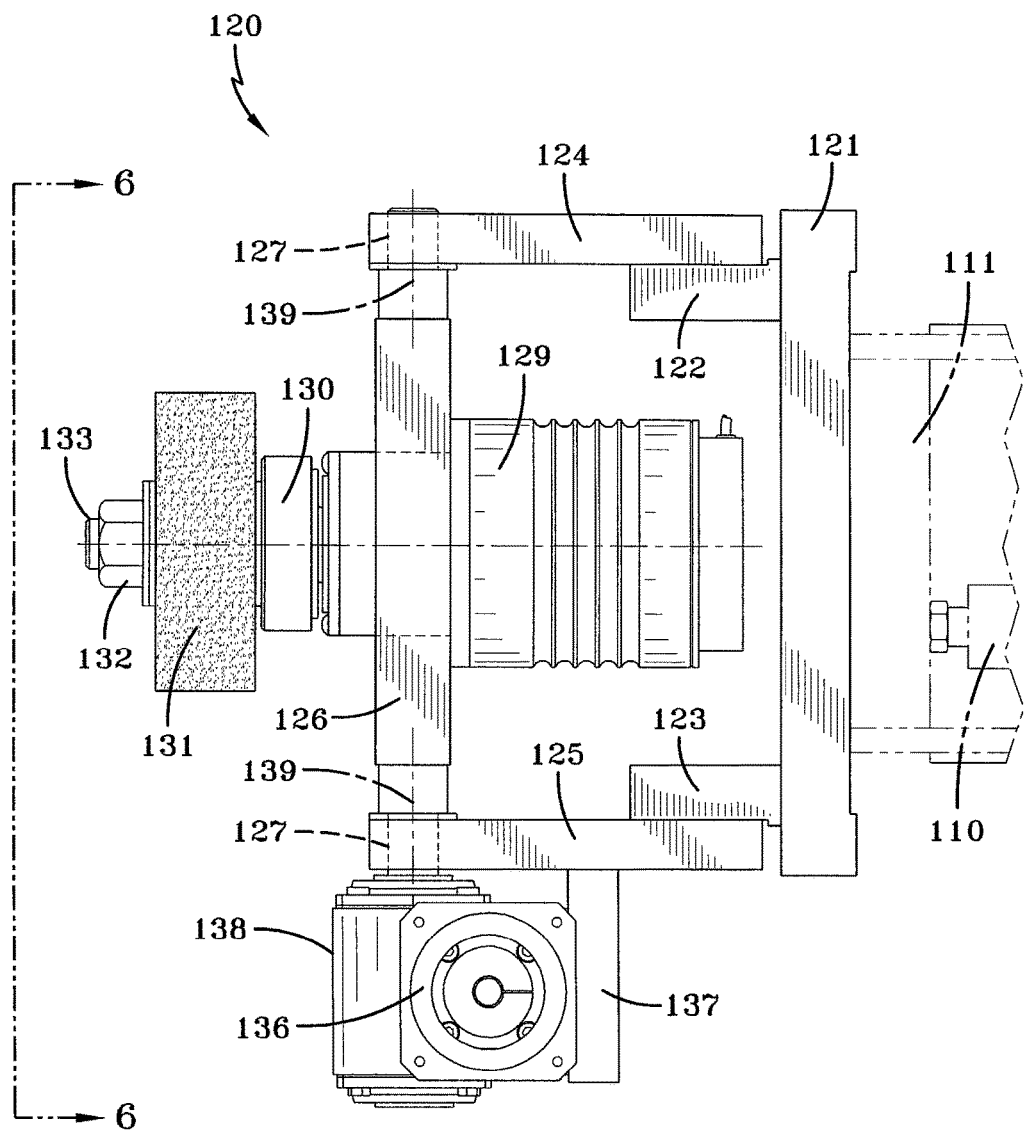
FIG. 5 is an elevational view of the shoulder flash removing assembly taken substantially along line 5-5 of FIG. 1.
Figure 6:
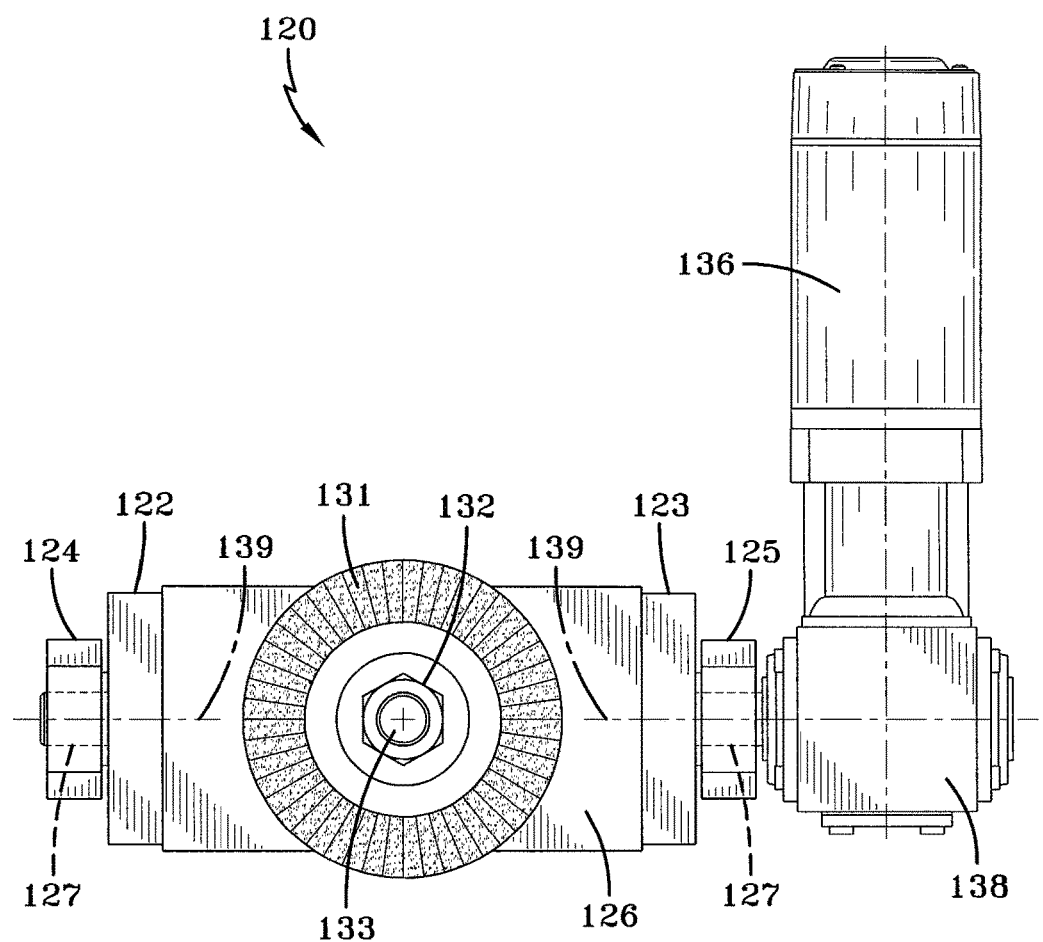
FIG. 6 is an elevational view taken along line 6-6 of FIG. 5.

Branch 111 of the slide plate carries a shoulder sanding head generally indicated by the numeral 120 and best shown in FIGS. 5 and 6. Shoulder sanding head 120 includes a mounting plate 121 having opposed tabs 122 and 123. Tab 122 carries an arm 124 and tab 123 carries an arm 125. A plate 126, having a shaft 127 on one end and a shaft 128 on its other end, carries a motor 129. An adapter 130 is carried by the shaft 133 of motor 129, and a sanding disc 131 is attached to adapter 130 by a nut 132 received on shaft 133. As such, the disc 131 can be readily replaced when worn. To do so, as shown in FIG. 3, bracket 105 is provided with a disconnect assembly 134 so that sanding assembly 100 may be pivoted on frame 102, as at 135, to gain access to sanding disc 131.

A motor 136 which pivots sanding disc 131 is carried by a plate 137 that is attached to arm 125. Through a right angle drive 138, motor 136 pivots plate 126 on shafts 127 and 128, thereby pivoting disc 131 on an axis 139.

In the operation of machine 10, after the tire T is in place and laser 63 has identified the profile of tire T, and with the tire not rotating, cylinder 73 moves disc 95 upwardly and cylinder 84 moves disc 95 inwardly to the starting point on the tread of the tire as identified by laser 63. Motor 93 then rotates disc 95 and at the same time cylinder 73 raises and lowers the disc 95 and cylinder 84 moves disc 95 to follow the profile of the tire and to remove the flash on the tread at that circumferential location on the tread. Motor 51 then indexes the tire T to the next circumferential area identified by the laser 63 as needing treatment, and the process is repeated until all identified flash is removed from the tread of tire T.

To remove flash from the shoulder area of tire T, motor 51 rotates the tire. While the tire is rotating, cylinders 101 and 110 move disc 131 to the position detected by laser 63. Moreover, disc 131 is pivoted by motor 136 to the proper angle for the profile of the tire, as identified by laser 63. As such, as the flash on the shoulder passes by disc 131, as tire T is rotating, the shoulder flash is removed. If it would be necessary to remove flash from the other shoulder of tire T, the tire could be inverted and held again by the spindle assemblies 35 and 44, or shoulder sanding head 120 could be moved into the position of the other shoulder, or a second shoulder sanding head could be provided, all as would be known by one skilled in the art based on the prior discussion herein.

In view of the foregoing, it should thus be appreciated that a machine constructed and operated as described herein accomplishes the objects of the invention and otherwise substantially improves the art.

What is claimed is:

1. Apparatus for removing flash from a tire comprising a sensor to detect the contour of the tire, a first sanding assembly having a sanding disc moveable generally vertically and generally horizontally in accordance with the detected contour to remove flash from the tread of the tire, and a second sanding assembly having a sanding disc moveable generally vertically, horizontally, and pivotally in accordance with the detected contour to remove flash from the shoulder of the tire.

2. The apparatus of claim 1 further comprising a motor to move said sensor vertically to detect the contour of the tire.

3. The apparatus of claim 2 further comprising a motor to rotate the tire.

4. The apparatus according to claim 1, said first sanding assembly including a first cylinder to move said first sanding assembly generally vertically, and a second cylinder to move said first sanding assembly horizontally dependent on the contour of the tire detected by said sensor.

5. The apparatus of claim 1 further comprising a main frame having tracks, said first sanding assembly including a cylinder attached to said main frame and carrying a sanding frame, said sanding frame riding on one of said tracks of said main frame.

6. Apparatus for removing flash from a tire comprising a sensor to detect the contour of the tire; a first sanding assembly moveable in accordance with the detected contour to remove flash from the tread of the tire; a second sanding assembly moveable in accordance with the detected contour to remove flash from the shoulder of the tire; and a main frame having tracks; said first sanding assembly including a cylinder attached to said main frame and carrying a sanding frame, said sanding frame riding on one of said tracks of said main frame, a slide bracket carried on one side by said sanding frame, and a bracket carried by an other side of said slide bracket, said bracket riding on an other of said tracks of said main frame.

7. The apparatus of claim 6 wherein said bracket may be disconnected from said other of said tracks so that said first sanding assembly may be pivoted.

8. The apparatus of claim 6 wherein said first sanding assembly includes a slide plate moveably carried by said slide bracket, and a second cylinder to move said slide plate with respect to said slide bracket.

9. The apparatus of claim 8 wherein said first sanding assembly includes a sanding head carried by said slide plate, said sanding head including a sanding disc rotatable by a motor to remove flash from the tread area of the tire.

10. The apparatus of claim 9, wherein said first sanding assembly includes a vacuum system to remove debris removed from the tire by said sanding disc.

11. The apparatus according to claim 1, said second sanding assembly including a first cylinder to move said first sanding assembly generally vertically, and a second cylinder to move said first sanding assembly horizontally dependent on the contour of the tire detected by said sensor.

12. The apparatus of claim 11 further comprises a main frame having tracks, said second sanding assembly including a cylinder attached to said main frame and carrying a sanding frame, said sanding frame riding on one of said tracks of said main frame.

13. Apparatus for removing flash from a tire comprising a sensor to detect the contour of the tire; a first sanding assembly moveable in accordance with the detected contour to remove flash from the tread of the tire; a second sanding assembly moveable in accordance with the detected contour to remove flash from the shoulder of the tire; and a main frame having tracks; said second sanding assembly including a cylinder attached to said main frame and carrying a sanding frame, said sanding frame riding on one of said tracks of said main frame, a slide bracket carried on one side by said sanding frame, and a bracket carried by an other side of said tracks of said main frame.

14. The apparatus of claim 13 wherein said bracket may be disconnected from said other of said tracks so that said second sanding assembly may be pivoted.

15. The apparatus of claim 13 wherein said second sanding assembly includes a slide plate moveably carried by said slide bracket, and a second cylinder to move said slide plate with respect to said slide bracket.

16. The apparatus of claim 15 wherein said second sanding assembly includes a sanding head carried by said slide plate, said sanding head including a sanding disc rotatable by a motor to remove flash from the shoulder area of the tire.

17. The apparatus of claim 16, wherein said second sanding assembly includes a vacuum system to remove debris removed from the tire by said sanding disc.

18. The apparatus of claim 16 wherein said sanding head includes a second motor to rotate said sanding head.

19. The apparatus of claim 1 further comprising a main frame, an upper spindle carried by said main frame, a lower spindle, and a cylinder to move said lower spindle toward said upper spindle, said lower spindle having a rim to carry the tire.

20. A method of removing flash from a tire comprising the steps of rotating the tire, sensing the contour of the rotating tire, removing tread flash from the detected contour of the tread area of the tire while the tire is not rotating, and removing shoulder flash from the detected contour of the shoulder area of the tire while the tire is rotating.

21. The method of claim 20 wherein the flash is removed from the tread area by a sanding disc, and the step of removing tread flash includes the steps of vertically and horizontally moving the sanding disc according to the contour of the tire detected by the sensing step.

22. The method of claim 20 wherein the flash is removed from the shoulder area by a sanding disc, and the step of removing shoulder flash includes the steps of vertically, horizontally, and pivotally moving the sanding disc according to the contour of the tire dictated by the sensing step.

* * * * *